May 29, 1962 E. B. KIRSCHSTEIN 3,036,644
ICE CUTTER
Filed March 19, 1959

INVENTOR.
ERVIN B. KIRSCHSTEIN
BY John W. Adams
ATTORNEY

United States Patent Office 3,036,644
Patented May 29, 1962

3,036,644
ICE CUTTER
Ervin B. Kirschstein, Wabasso, Minn.
Filed Mar. 19, 1959, Ser. No. 800,515
2 Claims. (Cl. 175—18)

This invention relates to a device for cutting holes in ice for ice fishing and the like.

It is an object of this invention to provide an easily portable and highly efficient ice cutting device which is of exceptionally light weight and inexpensive construction.

It is also an object to provide an ice cutting device having a single, easily sharpened, ice cutting blade formed into a centering point to stabilize the ice cutter through the ice, and providing the maximum amount of open space for the ice particles removed to pass up beyond the cutting surface of the ice cutter.

It is another object to provide such a device which will cut a hole through deep ice in one operation without the need to stop and remove the ice particles.

It is a further object to provide such an ice cutting device having a relatively slender upright drive shaft, and a supporting ring disposed at the bottom thereof to provide support for the ice cutting blade.

These and other objects and advantages of my invention will more fully appear from the following description made in connection with the accompanying drawings, wherein like reference characters refer to the same or similar parts throughout the several views, and in which.

Figure 3:
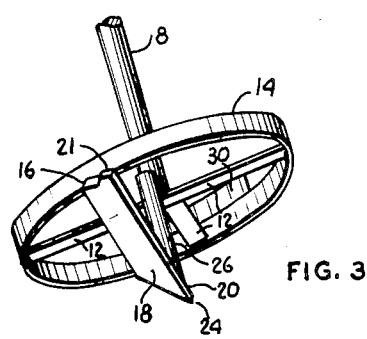
FIG. 3 is a perspective view showing the bottom of the device.

In the form of the invention shown in FIGS. 1 through 4 of the accompanying drawing, an upstanding drive shaft 8 is removably attached at the upper end thereof by rigid means such as a conventional chuck or sleeve to a source of rotary power such as the electric motor 10 having the lead wires 10a and 10b adapted to be clipped to a source of electric current such as the battery terminal of an automobile. A plurality of radially disposed supporting elements 12 are attached by conventional means such as welding or the like to the bottom of said drive shaft 8. A connecting ring 14 is attached to the outer ends of the supporting elements 12. A notch 16 is provided in the lower edge portion of the ring 14 as best shown in FIG. 3.

Figure 1:
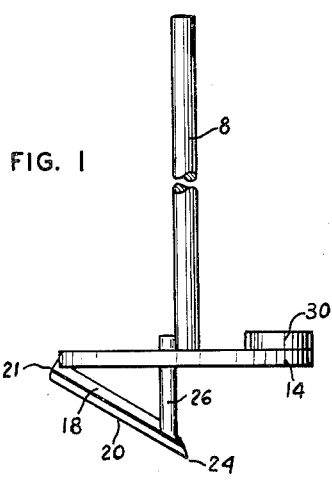
FIG. 1 is a side view of the drive shaft and cutting portion of a device embodying my invention.

An ice cutting blade 18 having its leading edge sharpened to form a cutting edge 20 on one side thereof is mounted with one end portion seated in the notch 16 and is secured to the ring 14 as best shown in FIG. 3. A portion 21 of the blade 18 extends slightly beyond the outer side of the member 14. The ice cutter blade 18 slopes downwardly toward the pointed center thereof from the ring 14, as shown in FIG. 1, and the lower inner portion thereof is sharpened to a centering point 24 which is disposed in axial alignment with the drive shaft 8.

A supporting strut 26 is attached to the lower end portion of the drive shaft 8, and extends downwardly therefrom and is attached to the upper side of the blade 18 above the point 24 thereof, to support the inner end of the cutting blade. A counterbalancing weight 30 sufficiently heavy to counterbalance the cutting blade assembly is attached to the upper portion of the ring 14 opposite the notch 16, as shown in FIGS. 1 and 3.

Figure 4:
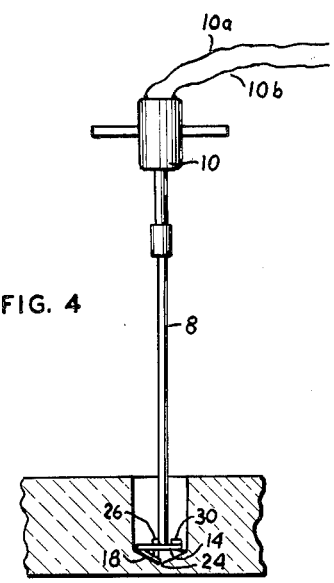
FIG. 4 is a side view showing an electric motor connected to the drive shaft.

As shown in FIG. 4, during the ice cutting operation the drive shaft is positioned generally normal to the surface of the ice, the point 24 of the ice cutting blade 18 serves as a centering point to stabilize the ice cutter during the cutting into the ice. The supporting ring 14 also serves as a stabilizing guide for the ice cutter within the vertical hole produced in the ice.

Figure 5:
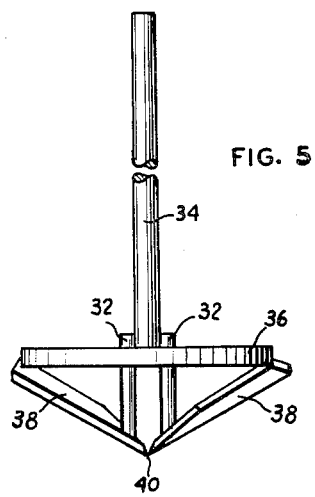
FIG. 5 is a side view of a modified form of the invention.
Figure 2:
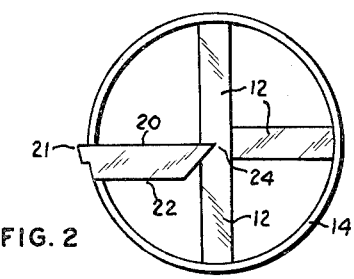
FIG. 2 is a bottom view of the device shown in FIG. 1.
Figure 6:
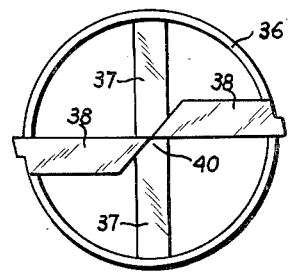
FIG. 6 is a bottom view of the modified form shown in FIG. 5.

In the modified form of the invention shown in FIGS. 5 and 6, a pair of cutters 38 generally similar to cutting blade 18 are provided. Supporting struts 32 are attached to the bottom of the upstanding drive shaft 34 and support the inner ends of cutting blade 38. A supporting ring 36 is attached to the outer edges of a pair of radial supporting members 37. The ice cutting blades 38 are supported by the ring 36 and slope downwardly therefrom toward the center. The blades 38 are sharpened into guiding points 40 at the lower portions thereof, said points being disposed together in axial alignment with the drive shaft 34.

It will, of course, be understood that various changes may be made in the form, details, arrangements and proportion of parts without departing from the scope of my invention, which generally stated consists in the matter set forth in the appended claims.

What is claimed is:

1. An ice drill comprising an upstanding drive shaft, a single inclined cutter blade having a pointed lower end disposed at the center of rotation of said shaft and rigidly connected with said shaft and extending in inclined relation outwardly therefrom, said blade being pitched to impart upward movement to the ice cut thereby, means for attaching the outer upper end of said blade to the shaft, counterbalancing means on the opposite side of said shaft from said blade to permit smooth high-speed rotation thereof, and an electric motor connected in direct driving relation to said shaft for producing high-speed rotation of said cutter whereby the ice cut thereby is delivered upwardly with sufficient force to carry the same out of the hole and thereby permit cutting of a hole in a single continuous operation even through a relatively thick ice mass.

2. The structure set forth in claim 1, and said electric motor including a pair of elongated lead lines removably connectable to the battery of an automobile to provide the electric power therefor.

References Cited in the file of this patent
UNITED STATES PATENTS

| | | |
|---|---|---|
| 2,352,326 | Kandle | June 27, 1944 |
| 2,709,573 | Reed | May 31, 1955 |
| 2,766,014 | Hanson | Oct. 9, 1956 |
| 2,854,218 | Hedrick et al. | Sept. 30, 1958 |
| 2,860,855 | Vincent | Nov. 18, 1958 |
| 2,893,695 | Gerlikowski | July 7, 1959 |
| 2,975,848 | Roberts | Mar. 21, 1961 |